Patented Apr. 12, 1938

2,113,812

UNITED STATES PATENT OFFICE 2,113,812

PRODUCTION OF CARBOXYLIC ACIDS FROM NITROHYDROCARBONS

Samuel B. Lippincott, Terre Haute, Ind., assignor to Purdue Research Foundation, La Fayette, Ind., a corporation of Indiana No Drawing. Application June 14, 1937,
Serial No. 148,107

8 Claims. (Cl. 260—112)

My invention relates to the production of carboxylic acids from primary nitrohydrocarbons.

The primary nitrohydrocarbons may be obtained according to a number of different reactions, but are most economically produced by vapor phase nitration of saturated hydrocarbons in accordance with the process of U. S. Patent 1,967,667 by H. B. Hass, E. B. Hodge and B. M. Vanderbilt. The nitroparaffins produced by this process from petroleum hydrocarbons constitute an advantageously cheap source of aliphatic compounds for the production of organic chemicals. I have now found that carboxylic acids may be produced from these nitrohydrocarbons with consistently satisfactory yields and conversions, by reacting the nitrohydrocarbons with certain mineral acids under the controlled conditions described below.

The process of my present invention may be briefly described as comprising subjecting the primary nitrohydrocarbon at a temperature above 110° C. and preferably below 160° C., to the action of from 1 to 3 moles of a mineral acid of the group hereinafter set forth, per mole of nitrohydrocarbon, the initial concentration of said acid being at least 75% by weight, and providing either initially or at a later stage of the reaction at least 1 mole of water per mol. of nitrohydrocarbon to complete the conversion to the carboxylic acid stage. According to this reaction 1 mole of hydroxylamine is formed for each mole of carboxylic acid produced, but the hydroxylamine may be partially or even completely destroyed under certain reaction conditions, especially if a highly oxidizing or highly reducing mineral acid is employed. The hydroxylamine remaining in the final reaction mixture is, of course, in the form of a mineral acid salt which may be separated from the carboxylic acid and unreacted materials in any suitable manner. The carboxylic acid may be recovered from the reaction mixture according to known methods such as distillation or extraction.

The nitrohydrocarbons which are suitable for my process constitute the primary nitrohydrocarbons, as, for example, the primary nitroparaffins, and the aryl or cycloalkyl substituted primary nitroparaffins such as phenyl-nitromethane or 1-nitro-2-cyclohexyl-ethane. The primary nitroparaffins containing two or more carbon atoms are particularly suited for use in my process. Among the nitroparaffins, nitroethane, 1-nitropropane, 1-nitrobutane, and 1-nitro-2-methyl propane are particularly advantageous in that their boiling points constitute suitable reaction temperatures, and the reaction mixture may thus be simply refluxed to effect the conversion. It should be distinctly understood, however, that my invention is not to be limited to any particular nitrohydrocarbons of this series, but is generally applicable to all nitrohydrocarbons containing the group $-CH_2NO_2$.

The acids which may be used to effect the conversion of the nitrohydrocarbons in my process comprise mineral acids having a dissociation constant in excess of $10^{-2}$. Among these may be mentioned hydrochloric, sulfuric, sulfurous, chlorosulfonic, orthophosphoric, pyrophosphoric, metaphosphoric, and nitric acids. It will be evident, of course, that some of these acids will be less advantageous than others. The acid employed should preferably be neither strongly oxidizing nor strongly reducing, and from this standpoint sulfuric acid may be seen to be particularly desirable. When sulfuric acid is employed as the converting agent, the products constitute carboxylic acid and hydroxylamine in approximately equimolecular proportions. However, when a strongly oxidizing acid such as nitric acid is employed, there is a tendency to oxidize the hydroxylamine and to cause other undesirable reactions. It will also be evident that operating conditions will govern the choice of the acid to be used as the converting agent. For example, if the reaction is to be carried out at atmospheric pressure it is impossible to secure a sufficiently high concentration of hydrochloric acid, whereas under sufficiently increased pressure hydrochloric acid may be satisfactorily used. In view of these considerations, and also from the standpoint of raw material cost, I prefer to utilize sulfuric acid, but it should be distinctly understood that my invention is not to be limited to the use of this particular acid. Any of the mineral acids having a dissociation constant in excess of $10^{-2}$ may be used, and one skilled in the art can readily choose a suitable acid for the particular reaction conditions to be employed.

I have found that the reaction of the present invention proceeds most rapidly with very concentrated acid solutions, but that the reaction will not proceed to completion unless 1 mol. of water per mol. of nitrohydrocarbon is provided in the reaction mixture. Thus, when employing anhydrous acids, such as 100% sulfuric acid, a final conversion of nitrohydrocarbon to carboxylic acid of the order of 50% is obtained; but optimum conversion may then be secured by introducing 1 mol. of water per mol. of nitrohydrocarbon, and continuing the reaction until the intermediate products are completely transformed to the carboxylic acid stage. This final conversion usually requires only from 5 to 15 minutes at the reaction temperature. Alternatively, the additional water may be introduced in a subsequent recovery operation, as, for example, in a steam distillation. By the use of anhydrous or very concentrated acid, it is thus possible to accelerate the first stage of the reaction and decrease the overall reaction time. The reaction is strongly exothermic, however, and in view of the higher reaction velocity secured by the use of very concentrated acids care should be taken to provide adequate cooling means to maintain the reaction temperature within the optimum range. With such precautions, acids of 95% concentration or higher, including the various grades of fuming sulfuric acid, may be satisfactorily employed with resulting saving in time.

A very satisfactory reaction mixture constitutes 1 mol. of nitrohydrocarbon, and 1 mol. of sulfuric acid in the form of 84.5% acid (constituting 1 mol. of acid and 1 mol. of water). With this mixture the acid concentration is sufficiently high to give rise to a rapid reaction rate without undue difficulty from the standpoint of heat evolution, and the requisite amount of water for the reaction is present in the initial mixture so that none need subsequently be added. In general, it may be said that the preferred acid concentration is that which will give rise to a rapid conversion rate without unduly rapid evolution of heat, which will be sufficiently miscible with the nitrohydrocarbon to insure ease of reaction, and which will give rise to a final solution in which the resulting hydroxylamine salt is insoluble. An acid of 75% to 100% concentration will usually be found to be satisfactory, and preliminary experiments will readily determine the optimum concentration for any particular acid under the reaction conditions to be employed.

The reaction temperature is preferably maintained between 100° C. and 160° C. At temperatures lower than 100° C. the reaction velocity is unsatisfactorily low, and at temperatures above 160° C. there is an increased tendency for decomposition reactions to take place. It will be evident, however, that higher temperatures may be suitably employed if the time of reaction is reduced sufficiently to avoid undue decomposition of the products. In a continuous process, for example, higher temperatures may be used in certain cases by increasing the space velocity in the reaction zone to a point at which the decomposition reactions proceed only to a very slight extent.

My invention may be illustrated by the following specific examples in which various nitrohydrocarbons are converted to the corresponding carboxylic acids by the use of a number of different types of acids as converting agents.

Example I

A reaction mixture comprising 75 parts by weight of nitroethane, 98 parts of $H_2SO_4$, and 18 parts of water was refluxed with stirring for approximately 8 hours. The reaction temperature during this period ranged from 113 to 117° C. The following results were secured:

| Product | Yield based on nitroethane reacted | Conversion based on nitroethane introduced |
| --- | --- | --- |
| Acetic acid | 92% | 85% |

Example II

A reaction mixture comprising 89 parts by weight of 1-nitropropane, 294 parts of $H_3PO_4$, and 33 parts of water was refluxed with stirring for 12 hours. The reaction temperature during this period ranged from 124 to 135° C. The following results were secured:

| Product | Yield based on nitropropane reacted | Conversion based on nitropropane introduced |
| --- | --- | --- |
| Propionic acid | 93% | 93% |

Example III

Approximately 89 parts by weight of 1-nitropropane was added to 108 parts of $H_2SO_4$ while stirring the mixture and maintaining the temperature at 100–103° C. The temperature was then raised to approximately 130° C. and maintained at that point for 50 minutes. At the end of this period 18 parts of water was introduced and the mixture was refluxed for 10 minutes. The following results were secured:

| Product | Yield based on nitropropane reacted | Conversion based on nitropropane introduced |
| --- | --- | --- |
| Propionic acid | 92% | 85% |

Example IV

A mixture of 89 parts by weight of 1-nitropropane, 36 parts of HCl, and 48 parts of water was placed in a pressure vessel and maintained at a temperature of 135–150° C. for 2¼ hours. The following results were secured:

| Product | Yield based on nitropropane reacted | Conversion based on nitropropane introduced |
| --- | --- | --- |
| Propionic acid | 91% | 91% |

Example V

A reaction mixture comprising 89 parts by weight of 1-nitropropane, 82 parts of $H_2SO_3$, and 18 parts of water was refluxed with stirring for 8 hours. The reaction temperature ranged from 128 to 140° C. The following results were secured:

| Product | Yield based on nitropropane reacted | Conversion based on nitropropane introduced |
| --- | --- | --- |
| Propionic acid | 96% | 92% |

Example VI

A mixture comprising 89 parts by weight of 1-nitropropane, 63 parts of $HNO_3$, and 30 parts of water was placed in a pressure vessel and maintained at a temperature of 135–150° C. for 4 hours. The following results were secured:

| Product | Yield based on nitropropane reacted | Conversion based on nitropropane introduced |
| --- | --- | --- |
| Propionic acid | 80% | 25% |

Example VII

A reaction mixture comprising 103 parts by weight of 1-nitrobutane, 98 parts of H₂SO₄, and 18 parts of water was refluxed with stirring for 2 hours. During this period the reaction temperature ranged from 145 to 158° C. The following results were secured:

| Product | Yield based on nitrobutane reacted | Conversion based on nitrobutane introduced |
|---|---|---|
| Butyric acid | 98% | 90% |

Example VIII

A reaction mixture comprising 103 parts by weight of 1-nitro-2-methyl propane, 98 parts of H₂SO₄, and 18 parts of water was refluxed with stirring for 8 hours. The reaction temperature ranged from 137 to 154° C. The following results were secured:

| Product | Yield based on nitromethyl propane reacted | Conversion based on nitromethyl propane introduced |
|---|---|---|
| Isobutyric acid | 90% | 90% |

It is to be understood, of course, that the above examples are illustrative only, and that my invention is not to be construed as limited to the particular materials or procedures set forth. Numerous modifications of procedure will naturally occur to those skilled in the art, and my invention includes any such modifications or the use of any obvious equivalents. For example, the reaction may be advantageously carried out under super-atmospheric pressure when employing any of the mineral acids specified above, and this procedure is not limited in its application to the use of hydrochloric or nitric acids. By increasing the pressure a higher reaction temperature may be secured in the case of the lower boiling nitrohydrocarbons, such as nitroethane, with a resulting increase in speed of conversion. In general, it may be said that a pressure should be employed which will insure liquid phase conditions at the reaction temperature utilized. Likewise, it will be evident that my invention can be carried out in a continuous manner by employing a reaction tube or vessel maintained at the desired reaction temperature, and passing the reaction mixtures through the heated zone at a space velocity sufficient to effect the desired reaction and minimize decomposition reactions. It will also be apparent that my process is applicable to the treatment of mixtures of nitrohydrocarbons as well as single compounds, and to the use of mixed acids as the converting agents, as well as the single acids employed in the above examples. All such modifications which are not excluded by the scope of the appended claims are to be considered as included in my invention.

My invention now having been described, what I claim is:

1. A process for the production of carboxylic acids from primary nitrohydrocarbons, which comprises subjecting the nitrohydrocarbon at a temperature in excess of 100° C. to the action of from 1 to 3 mols of a mineral acid having a dissociation constant in excess of $10^{-2}$, the initial concentration of said acid being at least 75% by weight, and providing at least 1 mol. of water per mol. of nitrohydrocarbon to complete the conversion to the carboxylic acid stage.

2. A process for the production of fatty acids from primary nitroparaffins, which comprises subjecting the nitroparaffin at a temperature of 100° C. to 160° C. to the action of from 1 to 3 mols of a mineral acid having a dissociation constant in excess of $10^{-2}$, the initial concentration of said acid being at least 75% by weight, and providing at least 1 mol. of water per mol. of nitroparaffin to complete the conversion to the carboxylic acid stage.

3. A process for the production of fatty acids from primary nitroparaffins, which comprises subjecting the nitroparaffin at a temperature of 100° C. to 160° C. to the action of from 1 to 3 mols of a mineral acid having a dissociation constant in excess of $10^{-2}$, the initial concentration of said acid being at least 95% by weight, and subsequently introducing water to provide a total of at least 1 mol. of water per mol. of nitroparaffin to complete the conversion to the carboxylic acid stage.

4. A process for the production of fatty acids from primary nitroparaffins, which comprises subjecting the nitroparaffin at a temperature of 100° C. to 160° C. to the action of from 1 to 3 mols of a mineral acid having a dissociation constant in excess of $10^{-2}$, the concentration of said acid being such that there is present in the reaction mixture approximately 1 mol. of water per mol. of nitroparaffin.

5. A process for the production of fatty acids from primary nitroparaffins, which comprises subjecting the nitroparaffin at a temperature of 100° C. to 160° C. to the action of from 1 to 3 mols of sulfuric acid, and providing at least 1 mol. of water per mol. of nitroparaffin to complete the conversion to the carboxylic acid stage.

6. A process for the production of fatty acids from primary nitroparaffins, which comprises subjecting the nitroparaffin at a temperature of 100° C. to 160° C. to the action of from 1 to 3 mols. of orthophosphoric acid, and providing at least 1 mol. of water per mol. of nitroparaffin to complete the conversion to the carboxylic acid stage.

7. A process for the production of fatty acids from primary nitroparaffins, which comprises subjecting the nitroparaffin at a temperature of 100° C. to 160° C. to the action of from 1 to 3 mols of hydrochloric acid, and providing at least 1 mol. of water per mol. of nitroparaffin to complete the conversion to the carboxylic acid stage.

8. A process for the production of fatty acids from primary nitroparaffins, which comprises reacting the nitroparaffin at a temperature of 100° C. to 160° C. with at least an equimolecular amount of sulfuric acid of approximately 84.5% concentration.

SAMUEL B. LIPPINCOTT.